United States Patent [19]
Keys

[11] Patent Number: 4,883,107
[45] Date of Patent: Nov. 28, 1989

[54] AIR INLET AND AUTOMATIC PRESSURE ADJUSTMENT DEVICE FOR A TIRE

[76] Inventor: Kenneth B. Keys, Rte. 13, Box 9502, Leander, Tex. 78641

[21] Appl. No.: 128,909

[22] Filed: Dec. 4, 1987

[51] Int. Cl.⁴ .................. B60C 29/00; B60C 23/00
[52] U.S. Cl. ..................................... 152/431; 141/38; 152/415; 152/539
[58] Field of Search ............... 152/431, 415, 427, 428, 152/429; 137/230, 228, 226, 543.13; 141/38, 302

[56] References Cited
U.S. PATENT DOCUMENTS

| | | | |
|---|---|---|---|
| 1,330,108 | 2/1920 | Bauhaus | 137/226 |
| 2,690,757 | 10/1954 | Orchowski | 137/226 |
| 2,987,071 | 6/1961 | Haus | 137/230 |
| 3,450,147 | 6/1969 | Webb | 137/226 |
| 4,153,096 | 5/1979 | Kirk | 152/429 |
| 4,445,527 | 5/1984 | Leimbach | 137/226 |
| 4,606,391 | 8/1986 | Achterholt | 152/431 |

Primary Examiner—Michael W. Ball
Assistant Examiner—Thomas Bokan
Attorney, Agent, or Firm—Joseph F. Long

[57] ABSTRACT

A dual valve assembly with calibrated or adjustable spring loading that may be attached to a valve stem on a tire to allow slightly over pressuring the tire with air and which then automatically adjusts the pressure in the tire to match a spring loading calibration.

2 Claims, 1 Drawing Sheet

AIR INLET AND AUTOMATIC PRESSURE ADJUSTMENT DEVICE FOR A TIRE

BACKGROUND OF INVENTION

This invention pertains to a dual valve assembly that allows both air filling and automatic pressure adjustment of a tire.

Currently most filling stations are partially or totally "self-serve" and there is a growing need for a valve that may be permanently installed on a tire that will allow the normal car owner to fill the tire with air and have the air pressure automatically adjust for proper tire inflation. Since different pressures are recommended for different vehicles, such a valve or set of valves would necessarily be made for different pressure ratings or would have a pressure adjustment.

My invention fulfills this need. The invention in its simplified form involves a primary valve with a spring loaded return inside a secondary valve which is held closed with a calibrated control pressure spring. This dual valve assembly threads onto the normal valve stem of a tire in one embodiment. In another embodiment it becomes part of the valve stem.

When the dual valve assembly is screwed on a valve stem, a collar containing a depressor spring under the dual valve assembly partially depresses the valve core valve when the assembly makes a pressure tight seal with the end of the valve stem. At this point the primary valve is opened in the normal way by the projection in the end of the air nozzle in the service station air hose. Both this primary valve and the valve in the valve core are then open. When the tire appears sufficiently inflated the user lifts the air hose filling nozzle from the valve stem and if the pressure inside the tire is high enough, the spring holding the secondary valve closed starts to depress and air then flows outward past the secondary valve to the atmosphere. The user adds air until this venting occurs. The venting continues until the pressure inside the tire falls sufficiently to allow the secondary valve to seat at the calibrated or adjusted spring pressure. The primary valve which seats in the secondary will be closed because of the pressure return spring and pressure within the tire.

In a second embodiment of the invention, the cap containing the dual valve assembly is itself fitted with a second cap that is used to adjust the compression of the spring in the secondary valve and thereby the final air pressure in the tire.

In a third embodiment the dual valve assembly is internally contained in a valve stem. This embodiment usually would have a spring pressure adjusting cap that threads into the top of the valve stem. This embodiment is meant for installation as original equipment or when a tire is changed. In this embodiment as well as the second embodiment the location of the cap in the threads may be marked to indicate compression of the secondary valve spring and thereby final pressure in the tire. The cap may be positioned at the factory for desired pressure or may be adjusted by the user.

This invention then covers a dual valve assembly that may be contained in a cap that screws on existing valve stems or may be an internal part of a valve stem. When the tire is filled with air in a normal way the secondary valve in the assembly will automatically allow air to flow outward through the valve stem until a preset internal pressure within the tire is obtained.

BRIEF DESCRIPTION OF THE INVENTION

The invention allows a user to fill a tire with air in the normal way, but when the user removes the filling hose the air pressure in the tire will bleed down to a preset pressure. In all three embodiments of the invention this pressure may be adjusted, but one usual pressure such as 28 psi for passenger tires will be factory preset.

The invention comprises a secondary valve that may be housed in an open cap that threads on to a valve stem with this secondary valve spring loaded so that air pressure within the tire will cause this secondary valve to open until pressure within the tire equals the spring loading. This spring loading is adjustable in order to allow pressure within the tire to be adjusted at the users option. In a first embodiment, this adjustment is made by a collar threaded into the open housing cap below the secondary valve. This collar also contains a depressor spring that opens the valve core valve when this open housing cap is threaded on to the valve stem in the tire. Now a primary valve in the assembly seats against the secondary valve and is biased toward the closed position with a light spring. The stem of this primary valve extends near the top of the open housing cap so that it will be depressed open when the service station air hose filling nozzle is pushed against the open cap. When the air hose filling nozzle is removed the primary valve is biased closed by the spring and also by pressure within the tire. If pressure within the tire is sufficiently high the secondary valve will open to bleed off pressure to match the adjusted spring loading on the secondary valve.

A second embodiment is essentially the same except the pressure may also be externally adjusted by a second open cap that threads into the first housing cap. The secondary cap may be screwed down against the secondary valve loading spring to adjust the pressure necessary in the tire to lift this secondary valve. This second open cap extends above the first cap and has calibration marks to show the position that will produce various pressure loadings on the secondary valve loading spring and thereby final pressure within the tire.

A third embodiment is housed within a valve stem and is similar to the second embodiment except the depressor spring and collar that it is attached to are no longer necessary and are omitted. The secondary valve in this embodiment seats against a resilient seat in the valve stem and is adjustably spring loaded with an open cap that is threaded into the valve stem to adjust loading on the secondary valve and thereby pressure within the tire. The upper portion of this secondary cap has calibration marks to indicate the internal pressure that will finally be in the tire. As in previous embodiments, a primary valve that seats in the secondary valve and is spring biased closed is opened to fill the tire with air when the service station air hose filling nozzle is pressed against this open cap that adjusts the spring loading on the secondary valve.

In the first two embodiments a resilient gasket is used to form a pressure tight seal between the lower collar of the dual valve assembly and the top of the valve stem. Resilient gaskets are also used under the secondary valve and on the upper face of the primary valve.

In the third embodiment wherein the dual valve assembly is housed in the valve stem, there needs only to be one resilient gasket for the secondary valve to seat against and one on the upper face of the primary valve.

Obviously, minor changes could be made in the invention without changing the function, so we do not wish to be limited to exact details, but only as to spirit and purpose and general design as outlined in these claims and specifications.

DETAILED DESCRIPTION OF THE DRAWINGS

Figure 1:
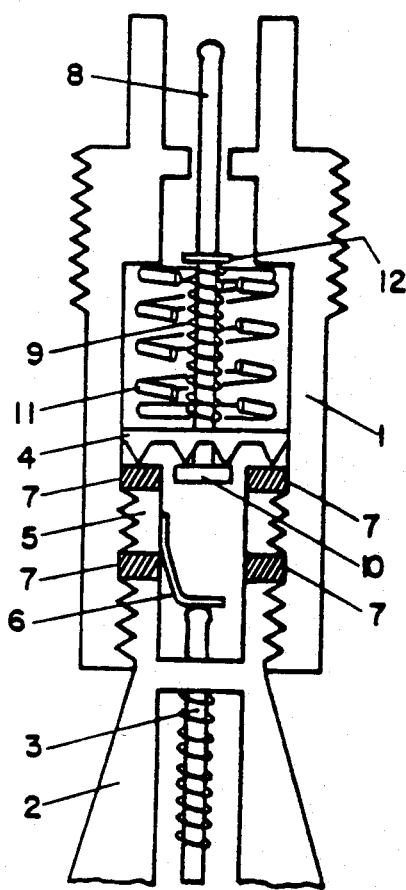
In FIG. 1, we show a cut-a-way view of a first embodiment wherein loading on the secondary valve 4 is adjusted by positioning the threaded collar 5 with the housing cap 1 while removed from the valve stem 2.

In FIG. 1, we show a cut-a-way view with cap or housing 1 being threaded on valve stem 2. A depression spring 6 mounted on a threaded collar 5 holds the valve core valve 3 open. Normal gaskets 7, such as neoprene, are used to make a pressure tight seal of the collar 5 against valve stem 2 and for pressure tight seat for spring loaded valve 4. As seen from the drawing, the pressure necessary to open the secondary valve 4 may be adjusted by location of the threaded collar 5.

The primary valve 8 is biased toward a closed position by return spring 9 butted against a plate 12 on the stem. The valve face 10 seats against the secondary valve 4. The secondary valve 4 is biased downward by the adjustable loading spring 11 and seats on a resilient gasket 7.

Figure 2:
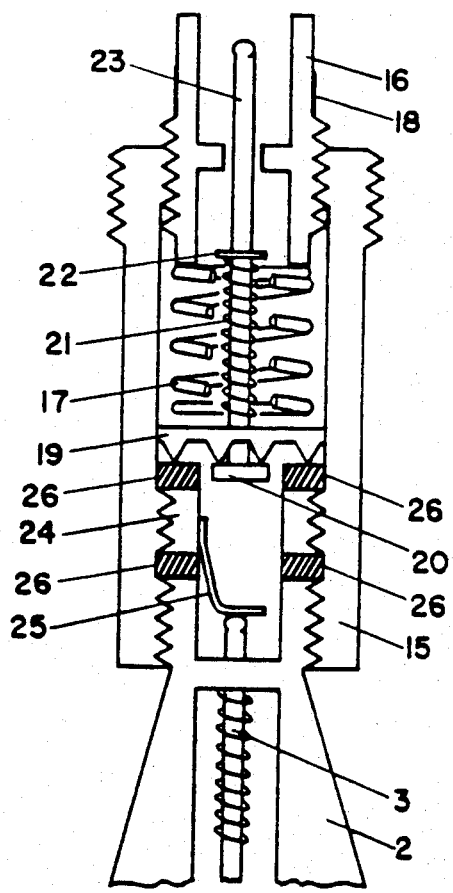
In FIG. 2, we show a second embodiment similar to the first embodiment, but with the housing 15 containing a threaded externally adjustable cap 16 that adjusts the spring 17 compression and thereby internal pressure in the tire.

In FIG. 2, we show a housing or cap 15 which is the same as FIG. 1, except for a second threaded cap 16 which may be used to externally adjust loading on compression spring 17, which causes the secondary valve 19 to be held closed with more or less pressure thereby adjusting final pressure within the tire. The top portion of the cap 18 contains markings to indicate location for various pressures. One pressure or location would be factory preset.

The primary valve 20 is biased closed with return spring 21 which may push against a circular flat plate 22 attached to the valve stem 23. Collar 24 contains a flat depressor spring to open the valve in valve core 3 and collar 24 seats against resilient gaskets 26.

Figure 3:
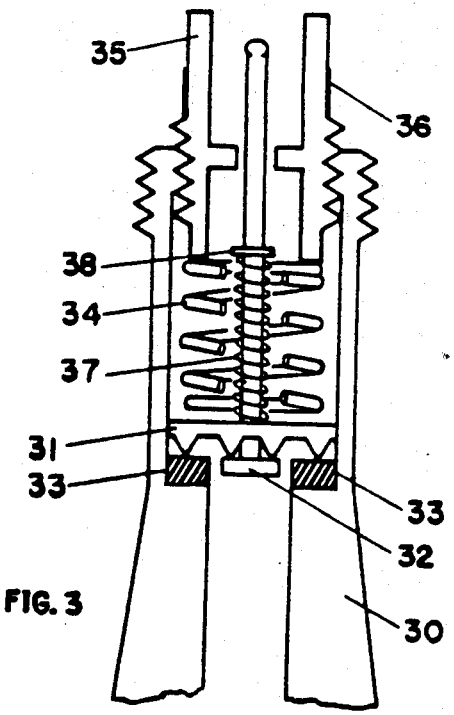
In FIG. 3, we show a third embodiment that is similar to the second embodiment, but the assembly of the spring loaded secondary valve 31 and primary valve 32 is housed in the valve stem 30.

In FIG. 3, the assembly is quite similar to FIG. 2, but since the assembly is housed in the valve stem the lower collar with a spring depressor (25 as shown in FIG. 2) is not necessary and is omitted. In this FIG. 3, the secondary valve 31 seats against a resilient gasket 33 in a valve stem 30. The primary valve 32 which may have a resilient face seats against the secondary valve 31. The secondary valve 31 is biased closed with adjustable loading spring 34. The loading spring 34 is adjusted with the second threaded cap 35. The portion 36 on this second threaded cap 35 is marked to indicate adjustments for various pressures. Normally this second cap 35 location would be factory preset at a usual pressure—such as 30 psi for passenger car tires with marked locations for 25 and 35 psi tire internal pressure. Markings for higher pressure would be needed for truck tires. The primary valve 32 is biased closed by spring 37 pushing against plate 38.

Operation of this assembly is similar to embodiments shown in FIG. 1 and FIG. 2. The user puts air in the tire in the normal way. When he or she has pressured the tire sufficiently and removes the filling hose, the primary valve 32 closes and the internal pressure in the tire will push the secondary valve 31 open allowing air to escape outward through the adjustable second cap 35 until the pressure internal to the tire matches the spring 34 loading in the secondary valve 31.

I claim:

1. An assembly to allow air filling and automatic pressure adjustment of a tire comprising:
    (a) a housing means with an externally threaded upper end
    (b) an adjustable loading spring contained in said housing means
    (c) a secondary valve held down by said adjustable loading spring
    (d) a primary valve with a stem extending through the top of said housing means and through said secondary valve
    (e) a seat in said secondary valve to seat said primary valve
    (f) a return spring around said stem of said primary valve that urges said primary valve to seat in said secondary valve, and (g) wherein said housing means is a cap containing an internal collar threaded externally under said secondary valve with said collar containing a depessor spring to open a valve core valve in a valve stem and further serving the purpose of adjusting said adjustable loading spring.

2. An assembly to allow air filling and automatic pressure adjustment in a tire as in claim 1 where said cap further has a threaded second cap that may be used to adjust said adjustable loading spring while said cap is threaded on to said valve stem.

* * * * *